No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 1.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)

(No Model.) 13 Sheets—Sheet 2.

Fig. 1$^A$.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 4.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 5.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 6.

Fig. 9.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 7.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)

(No Model.) 13 Sheets—Sheet 8.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 10.

No. 696,536. Patented Apr. 1, 1902.
G. S. BAKER & W. T. CARR.
APPARATUS FOR AUTOMATICALLY COATING BISCUITS, &c.
(Application filed Nov. 13, 1900.)
(No Model.) 13 Sheets—Sheet 13.

Fig. 19.

United States Patent Office.

GEORGE SAMUEL BAKER, OF LONDON, AND WILLIAM THEODORE CARR, OF CARLISLE, ENGLAND.

APPARATUS FOR AUTOMATICALLY COATING BISCUITS, &c.

SPECIFICATION forming part of Letters Patent No. 696,536, dated April 1, 1902.

Application filed November 13, 1900. Serial No. 36,344. (No model.)

*To all whom it may concern:*

Be it known that we, GEORGE SAMUEL BAKER, residing at London, and WILLIAM THEODORE CARR, residing at Carlisle, England, subjects of the Queen of England, have invented certain new and useful Improvements in Apparatus for Automatically Coating Biscuits and other Articles with Fluid or Semifluid and Solid Material, (for which application has been made in Great Britain under No. 14,967, dated August 21, 1900,) of which the following is a specification.

This invention relates to apparatus for automatically coating in succession with the aid of a stencil the individual members of a series of biscuits or other articles with fluid or semifluid material and also for placing in certain cases a layer of solid material upon that fluid or semifluid coating.

According to this invention, which is hereinafter described by way of example in its application to the coating of biscuits with icing, though applicable to other analogous uses, the biscuits are taken automatically from a source of supply and coated automatically in succession. They may afterward be placed in the desired order on a conveyer. The present invention is believed to be the first by which a series of consecutive operations beginning with the mechanical withdrawal of biscuits or the like from the source of supply and terminating with the coating of the article or the disposal of the coated article on the conveyer can be automatic throughout. From the conveyer the iced biscuit may be delivered to drying-chambers or otherwise disposed of, as may be desired. On its way to the drying-chambers it may be led under a device, such as is hereinafter described, which lays a covering biscuit upon the iced coating of each coated biscuit, so as to produce biscuit sandwiches, each consisting of a layer of icing or other composition and the two biscuits between which the icing is retained.

In machines constructed according to this invention the application of the coating to the biscuit or the like is effected by the employment of a stencil-plate provided with perforations having the shape in which the icing is to be laid on the biscuit in combination with a bottomless hopper, the two having relative motion, say, by reciprocation of the hopper along the upper surface of the stencil-plate, so that it is alternately over perforated and unperforated portions of the plate. An important feature of this invention is the combination, with such a stencil-plate and hopper, which are well known, of apparatus by which the biscuits are in turn taken from a source of supply and lifted up and held against the under side of the stencil beneath its perforation while they receive a deposit of icing in pattern or outline corresponding to that of the stencil at the times when the outlet of the hopper comes from over the unperforated portion of the stencil (which serves to close it) to the perforated portion. It will be observed from the foregoing that the stencil-plate serves also as the hopper-valve.

Other important features of this invention are devices such as are hereinafter exemplified for effecting and controlling the reciprocation of the hopper, for retaining the biscuits in proper position while they are receiving the icing upon their surfaces, for insuring their disengagement, pneumatically or otherwise, from the stencil, for enabling different portions of a biscuit to be iced of different colors, and for producing biscuit sandwiches.

In the accompanying drawings, Fig. 1ª is a side elevation, partly in section, corresponding with the perspective view Fig. 1.

Like letters of reference indicate like parts throughout the drawings.

In the machine illustrated by Figs. 1 to 9 the main framing A supports shafts B, C, D, and E in suitable bearings. Power is supplied from any convenient source to the shaft C, which drives by gearing the companion shaft B. Upon the shaft C is a cam C', and on the shaft D at its ends, which project beyond the frame A, are arms D', linked by links D$^2$ to sliders F, which can be reciprocated in guides A' by the arms D'. To enable the cam C' to cause the arms D' to oscillate for the purpose of producing such reciprocation, an arm D$^3$ is fixed on the shaft D intermediate of its ends and provided with an antifriction-roller D$^4$, which bears against the cam C'. The roller D$^4$ is kept in contact with the cam C' by means of a spring D$^5$, secured at one end to the frame A and at the other end to the arm D$^3$, the cam operating to move the arm D$^3$ away from it and the spring serving to return it in a manner generally understood.

Figure 1:
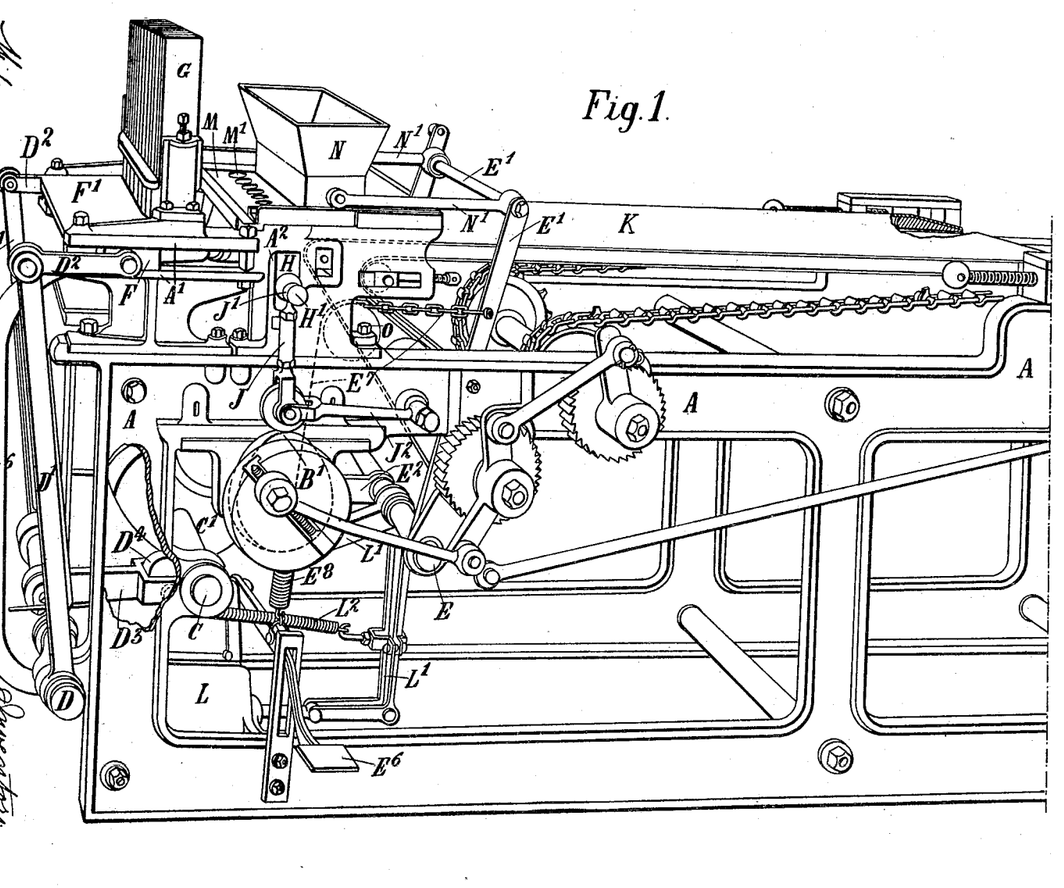
Figures 1 and 2 are respectively side and end views in perspective of one construction of machine according to this invention.
Figure 1A:
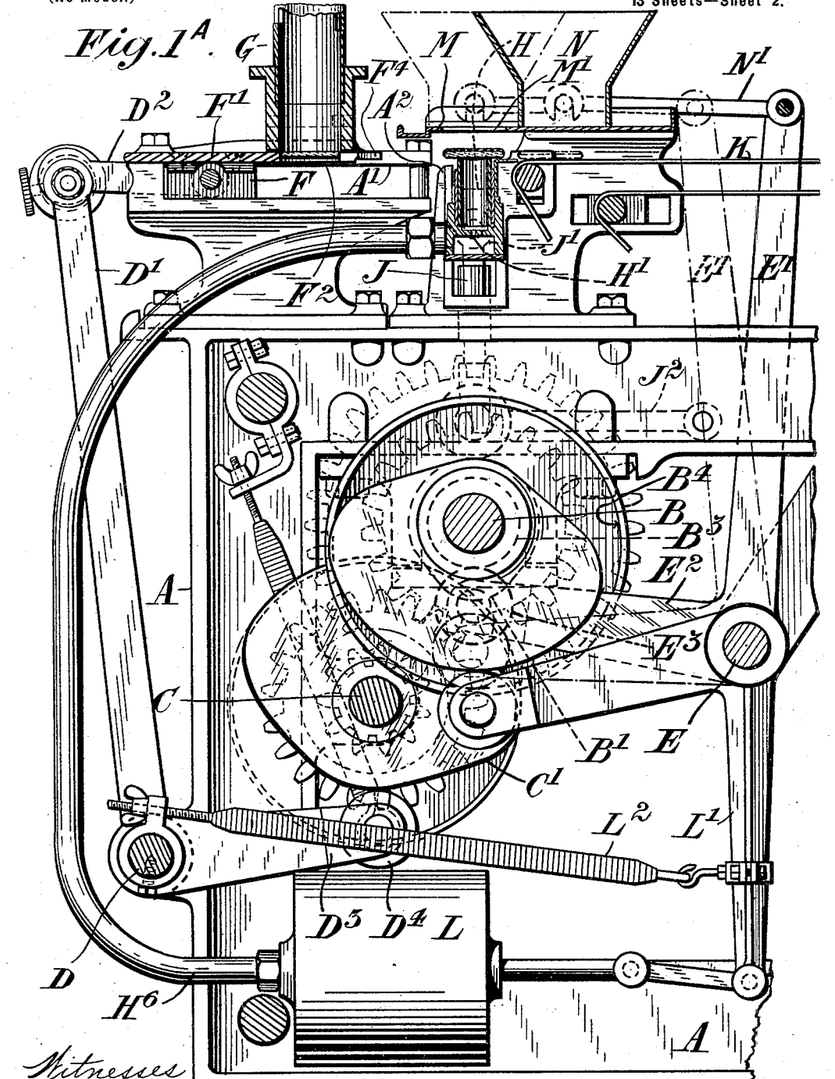
Figure 2:
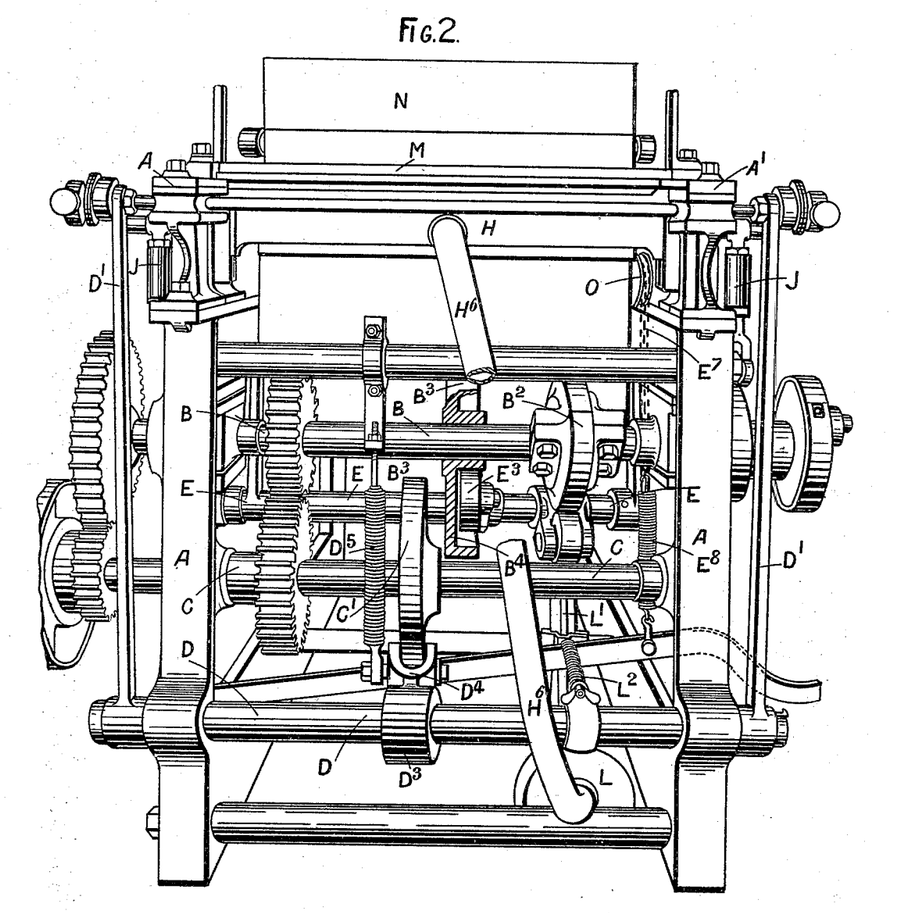
Figures 3, 4, 10:
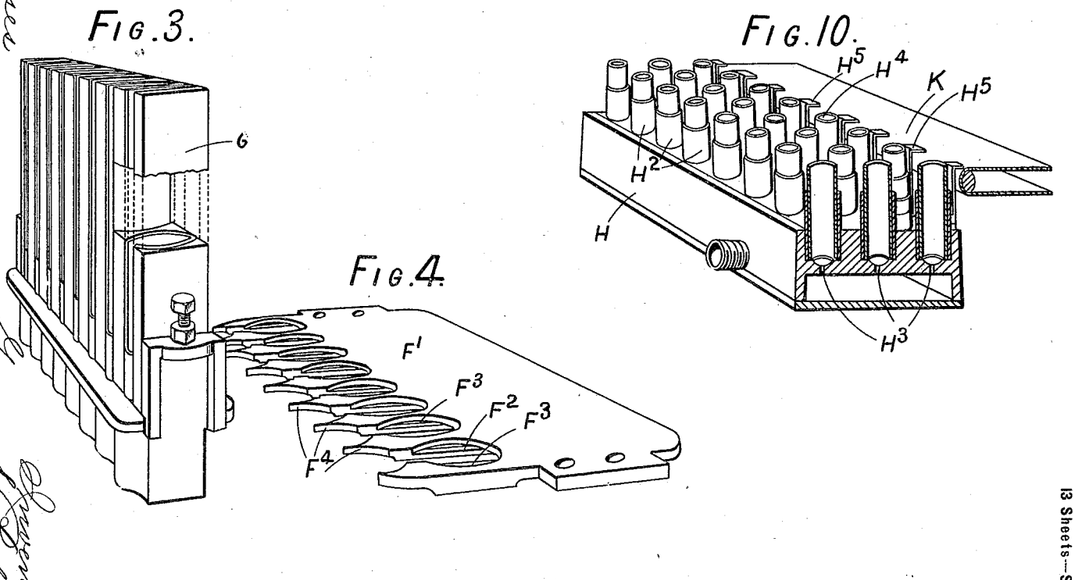
Figs. 3, 4, 5, 6, and 7 are perspective views of respectively the feed-columns, feeder-plate, lifting-retainer, serving also as a pneumatic disengager, stationary stencil-plate, and reciprocating hopper, all comprised in the machine illustrated by Figs. 1 and 2.
Fig. 10 illustrates in perspective an alternative construction of pneumatic disengager, partly in section, in which a group of pneumatic tubes is alloted to each biscuit.

Between the sliders F the feeder-plate F', secured to them, extends across the machine. Above it is secured on the frame A a group of feeder-columns G. Each of these columns is charged with biscuits piled one upon another and is open at its lower end, so that the lowermost biscuit in each column rests on the top surface of the plate F', which is smooth, except near its leading edge, at which there are depressions F$^2$, partially closed at their bottoms by supporting-bars F$^3$ and having projections F$^4$ between them which act as ejectors, as hereinafter described. The feeder-plate reciprocates in a horizontal plane. In front of it, parallel with it and arranged to reciprocate in a vertical plane, is a combined lifting-retainer and pneumatic disengager, the body of which is a hollow bar H, with its ends arranged to travel in guides A$^2$ in the frame A, in which they are raised and lowered by links J, having jaws J' at the upper ends, which receive pins H', projecting from the ends of the bar. The lower ends of the links J are in turn controlled by radius-rods J$^2$, pivoted to the frame A and operated by cams B', secured to the outer ends of the shaft B. The radius-rods carry antifriction-rollers at their junction with the links J.

Figures 5, 6, 8:
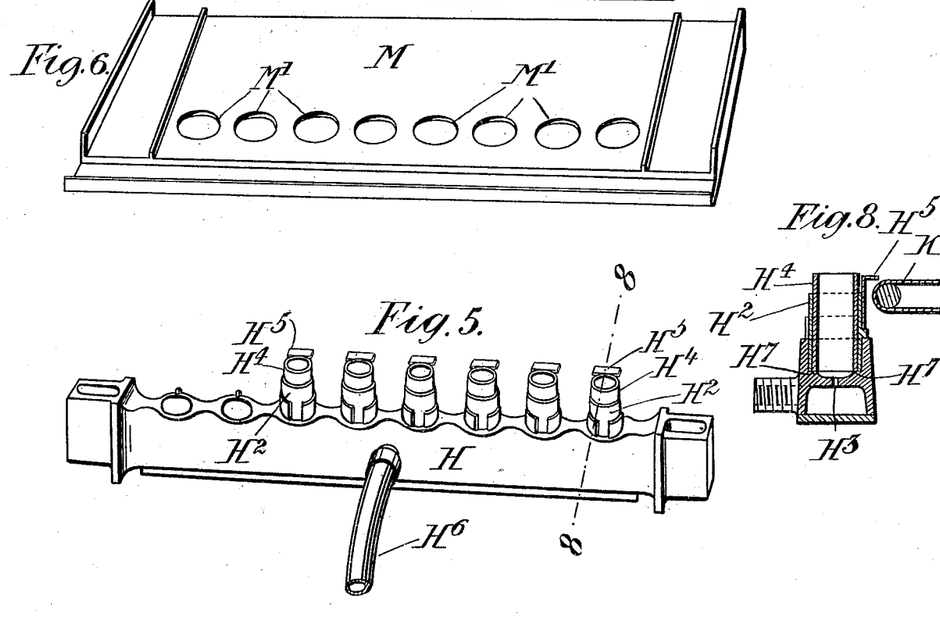
Fig. 8 is a vertical section transverse to the length of the disengager shown in Fig. 5, taken on the line 8 8 of that figure.
Figure 7:
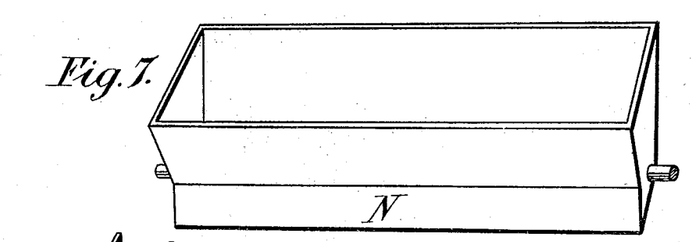
Figure 9:
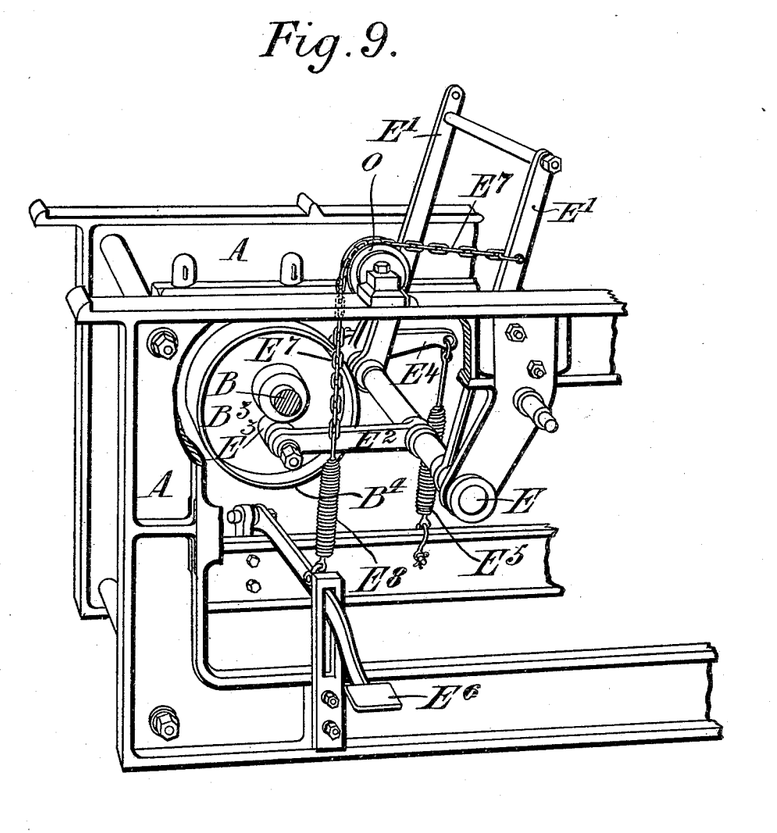
Fig. 9 illustrates the cam for operating the reciprocating hopper and also mechanism by which it is insured that the hopper shall cease to reciprocate and to deliver icing whenever the foot of the attendant is removed from the pedal shown.

From the hollow bar H tubes H$^2$, each communicating with its interior by a constricted passage H$^3$, (see Fig. 8,) extend upward, and each carries within it an elastic tube H$^4$, the top end of which extends above the containing-tube H$^2$. Just below the top end of each elastic tube H$^4$ is a small guide-plate H$^5$, stationary on the tube H$^2$, to which it is secured by a clip and forming a bridge between the top end of each tube H$^4$ and the adjacent surface of an endless-belt conveyer K at times when the bar H is at the lower extreme of its travel, these being the times at which a biscuit previously held on the top of each tube H$^4$ is required to slide edgewise from that situation onto the conveyer.

A flexible tube H$^6$ connects the interior of the bar H with that of a vacuum-pump cylinder L of any convenient construction, the piston of which is operated by a bell-crank lever L', which can oscillate around the shaft E, on which it is supported, under the action of a cam B$^2$, fixed on the shaft B intermediate of its ends and shaped to give a quick suction-stroke to the vacuum-pump piston for a reason which will hereinafter appear. The bell-crank lever L' is moved in one direction by the action of the cam B$^2$ and returned in the opposite direction under the control of the cam by a spring L$^2$, secured at one end to the lever and connected at the opposite end to the frame A. The passages H$^3$, Fig. 8, are constricted relatively to the bore of the tubes H$^4$, in order to check the rapid influx of air into the interior of the bar H, which would tend to occur should the top of any one of the elastic tubes become unsealed by displacement of the biscuit borne on it during the existence of a partial vacuum in the bar H, the cylinder L, and the connections between them. Such influx being thus checked the vacuum is not destroyed sufficiently to neutralize its object should the accidental unsealing of any of the tubes H$^4$ occur.

Above the upper limit of travel of the tubes H$^4$ with the bar H is the stencil-plate M, fixed to the frame A and provided with perforations M', having the outline (in this instance circular) in which the icing is to appear on the biscuit. In the example illustrated a perforation M' comes exactly above a corresponding tube $H^4$ of the bar H. A bottomless hopper N is caused to reciprocate along the upper surface of the plate M by links N', connecting it to a rocking frame E', fixed upon the shaft E. This shaft is oscillated by another arm $E^2$, actuated by the flange $B^4$ of a cam $B^3$, secured on the rotatable shaft B. From Fig. 9 it will be seen that the arm $E^2$ is intended to bear by means of a roller $E^3$ on the interior circumference of the cam-flange $B^4$ and to be actuated by that interior circumference. At the end of the shaft E is secured an arm $E^4$, on which a spring $E^5$, attached to the frame A, pulls continually. This spring and the arm $E^4$ are so disposed that they will always tend to move the shaft E in such a direction as to bring the antifriction-roller of the arm $E^2$ against the boss of the cam $B^3$, and thus shift the hopper N to and keep it at that extreme of its travel which is over the unperforated end of the stencil-plate M; but when it is desired to keep the hopper in reciprocation the action of this spring $E^5$ is neutralized and overcome by pressing down a pedal $E^6$, pivoted to the main frame A and connected by a connection $E^7$, passing over a guide-roller O on the frame A to the rocking frame E'. The connection $E^7$ is elastic, inasmuch as it comprises a spring $E^8$, and this latter is of such strength or given such leverage that while it permits the rocking frame E' to respond to the action of the cam $B^3$ it can overcome the other spring $E^5$ when the pedal $E^6$ is depressed. If desired, the spring $E^5$ and arm $E^4$ may be dispensed with, the cam action being relied on to throw the hopper into inoperative position when the pedal is raised.

The operation of this machine is as follows: The feeder-columns G having been charged, the feeder-plate F' retires until the lowermost biscuit in each column drops into the depression $F^2$ provided for it in that plate, in which it is supported by the supporting-bars $F^3$. The feeder-plate then advances, carrying a biscuit in each depression, the smooth part of the plate in rear of the depressions preventing the remaining biscuits in the columns G from issuing till next required. By the advance of the feeder-plate each of the biscuits therein is brought above the top of the elastic tube $H^4$ allotted to it on the combined lifting retainer and disengager-body H, which at this time is at the lower limit of its travel. Next the bar H rises, causing the tops of the tubes $H^4$ to pass upward through the openings between the supporting-bars $F^3$ in the feeder-plate, lifting the biscuits off those bars and bringing them against the under side of the stencil-plate M, beneath the perforations M' in it. In this operation the elasticity of the tubes $H^4$ serves two purposes, one being that of a support or retainer for the biscuit, which shall be sufficiently yielding to prevent any risk of crushing it against the stencil, and the other being that of a tube which as soon as pressure comes upon it endwise shall automatically bed or press one end against the biscuit and the other end against a shoulder $H^7$ (see Fig. 8) in the bar H, so as to make a fluid-tight joint with each. The biscuits arrive up at the stencil-plate M at a time when the hopper N is over the unperforated portion thereof and is closed thereby. Immediately upon their arrival the hopper is made to traverse the stencil-plate and retire again to its first position, thus drawing over the biscuits at the perforations M' the icing with which it is charged and which exudes into the stencil from its lower end. The icing being thus completed, the hollow bar H descends, the tubes $H^4$ pulling the biscuits away from the stencil with them pneumatically. Just as the bar H is about to descend the piston in the vacuum-pump cylinder L makes a rapid suction-stroke, so that the biscuits may be retained firmly upon the top ends of the elastic tubes $H^4$ and by them disengaged sharply and with certainty from the stencil (which may happen to be sticky) during the downward movement of the bar which follows and in which the biscuits get down to the level of the feeder-plate F', at which level they cease to descend. Immediately thereafter the feeder-plate F' repeats its advance movement to bring forward a second row of biscuits for subjection to the several operations just described, and in so advancing the plate F' pushes, by means of the ejector projections $F^4$, the iced biscuits off the tubes $H^4$ across the guide-plates or bridges $H^5$ onto the adjacent intermittently-moved belt conveyer K, thus completing the cycle of automatic operations to which the machine subjects each series of biscuits obtained by the feeder-plate from the source of supply.

The cams by which the several operations are effected are simple eccentric or single-lobe cams, needing no special description, and the proper timing of these operations in relation to each other is effected by a suitable setting of the cams and gearing together of their shafts in a manner well understood by engineers.

Fig. 10 illustrates in perspective, partly in section, a construction of pneumatic disengager in which for the purpose of engaging biscuits possessing great length and little width a group of three elastic tubes $H^4$ of the kind hereinbefore described is provided for each biscuit.

Figures 11, 14, 15:
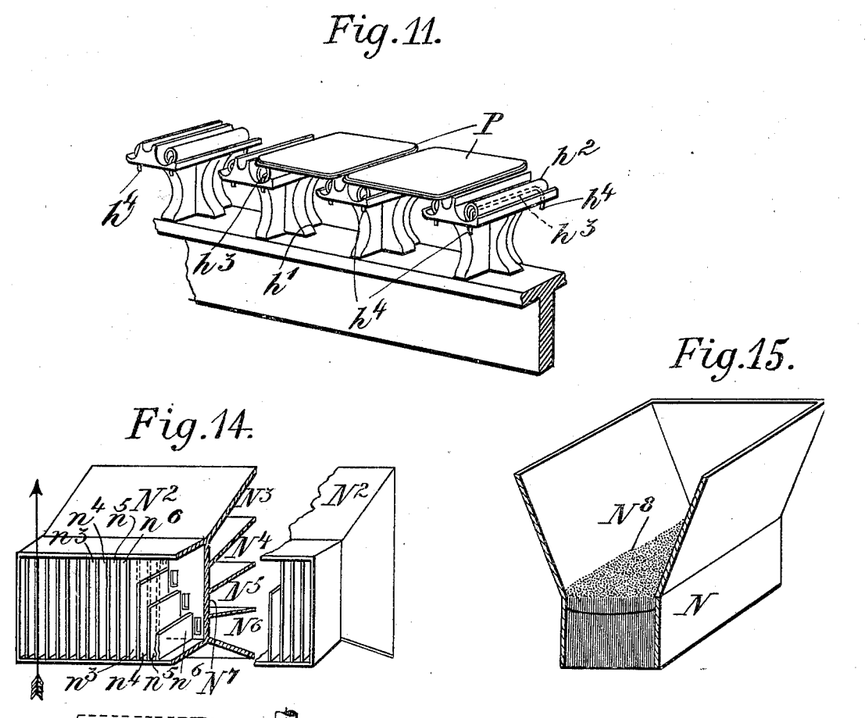
Fig. 11 is a perspective view of a non-pneumatic retainer, and Fig. 12 a similar perspective view to which is added the pattern of feeder-plate employed with the retainer shown in Fig. 11.
Fig. 14 is a view, partly in section, of a multicolor hopper, hereinafter described in detail.
Fig. 15 is a perspective view, partly in section, of one-half of a hopper with brushes provided at its outlet in the manner hereinafter explained.
Figure 12:
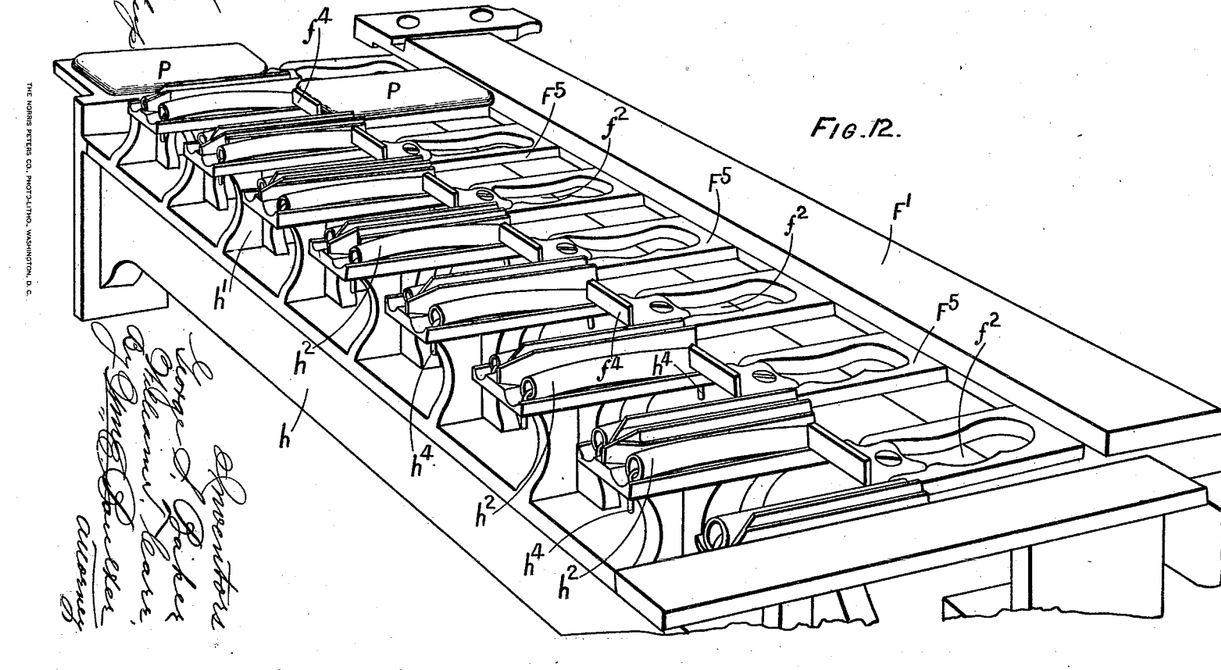
Figure 13:
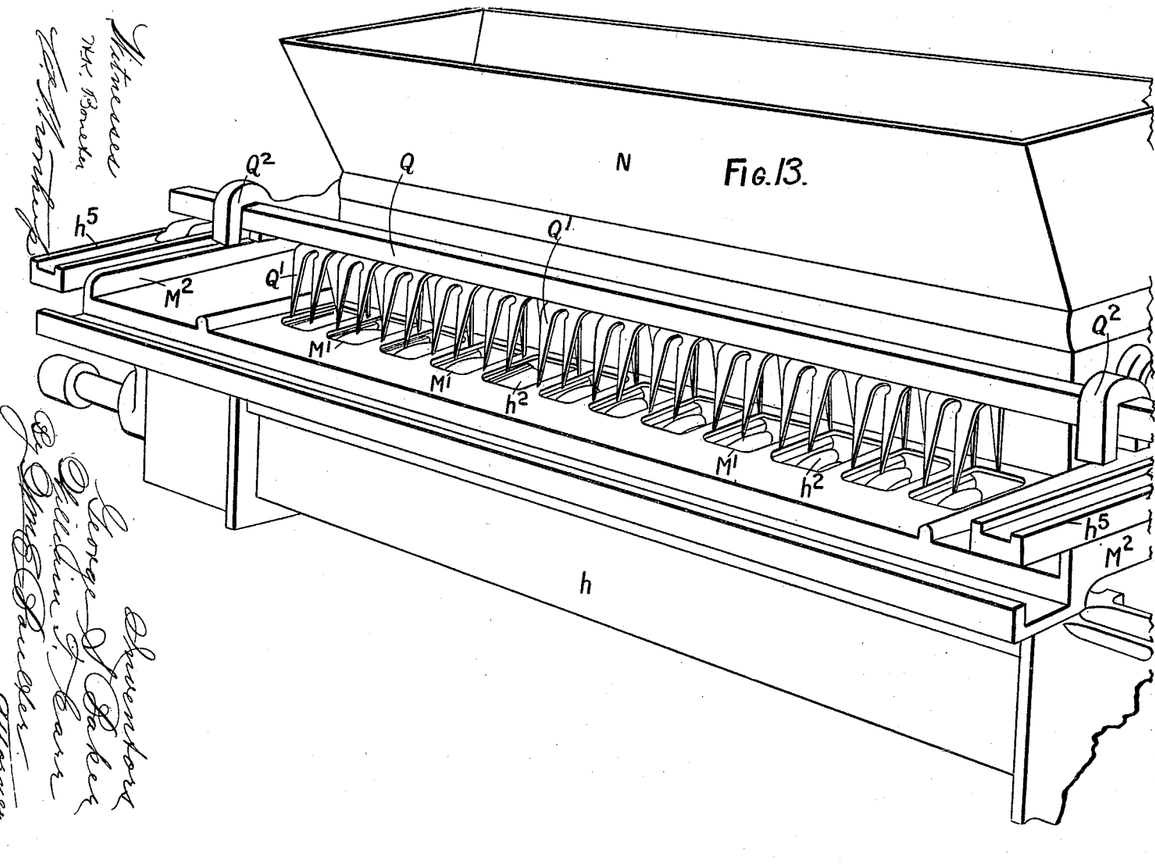
Figs. 13 and 13$^a$ are perspective views of a modified disengager and of related parts, all adapted for use with the retainer and feeder-plate shown in Figs. 11 and 12.
Figure 13A:
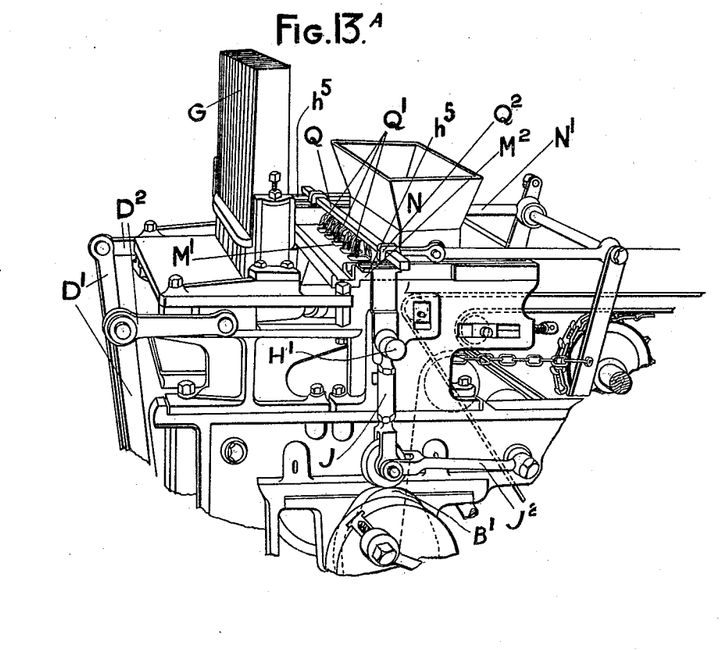

Fig. 11 illustrates, as aforesaid, an alternative and non-pneumatic construction of device for receiving the biscuits from a feeder-plate, lifting them, and retaining them by yielding supports against the under side of the stencil-plate. It consists of a lifter-bar h, which corresponds with the bar H in the pneumatic device first described and is reciprocated by similar mechanism—viz., pins H', links J', radius-rods J², and cams B'. Instead, however, of being hollow and carrying tubes to engage the biscuits it is merely a frame having upon it vertical projections h', each supporting two yielding facings h², consisting of a short length of rubber tube held in place by a wire h³, extending through each tube and having downwardly-turned ends h⁴, which are passed through the projections, so as to keep the wires and facings in place. The biscuits are supported between adjacent projections, one yielding facing of a projection coming under one side of the biscuit and one under the opposite side, as will be seen from Fig. 11, in which are shown biscuits P thus supported. With this construction of lifting retaining device the feeder-plate F' must be of the pattern illustrated in Fig. 12 and must carry the biscuits forward from the feeder-columns G to the projections h' by extensions F⁵, in which are depressions f², the ends f⁴ of which serve a purpose similar to that of the projections F⁴, hereinbefore referred to, pushing the biscuits after they have been iced off the facings h² onto the conveyer or other device provided for their ultimate reception. It should be noted that this device while operative to lift the biscuits up to and retain them against the bottom of the stencil does not withdraw them therefrom after the icing is done, and therefore for this latter purpose the disengager (shown in Figs. 13 and 13ª, which illustrate also other parts of the apparatus adjacent) is employed with it. This disengager comprises a bar Q, from which fingers Q' extend down toward the perforations M' of the stencil, which happen in this instance to be oblong. This bar is linked to the lower portion of the reciprocating hopper N by links Q², pivoted to the latter, as shown, and it extends above and beyond side flanges M² of the stencil-plate, so as to bear at certain times upon them and at other times upon horizontal extensions h⁵ of the vertically-moving bar h. When that bar h rises to elevate the biscuits to the level of the under side of the stencil-plate, the extensions h⁵ rise with it and lift the bar Q far enough to take the fingers Q' upward clear of the biscuits and of the perforations of the stencil. While they are thus upheld they move forward, when the hopper N moves to the perforations, for the bar Q then travels along the extensions aforesaid. When the hopper returns, the bar Q is drawn back by it, so as to bring the fingers over the perforations again, and thereafter upon descent of the bar h the bar Q follows it downward far enough to cause the fingers Q' to push the iced biscuits down off the stencil, the bar being stopped, however, in its downward movement by the flanges M² of the stencil-plate, which thus check it in order to prevent the fingers upon it from descending far enough to foul the series of iced biscuits on the way to the conveyer K or those next fed under the stencil by the feeder-plate.

Fig. 14 illustrates in perspective, partly broken away, a construction of reciprocating hopper by which different portions of each biscuit can be iced of different colors, the particular hopper illustrated being adapted to deliver four colors in parallel stripes onto each biscuit. In the upper portion N² of the hopper there are four troughs N⁶ N³ N⁴ N⁵, all extended transversely across the line of travel which the biscuits pursue in relation thereto and which is indicated by the arrow. In the lower or delivery portion of the hopper there are groups of smaller troughs n³ n⁴ n⁵ n⁶. The mouths of these latter are situated at right angles to those of the larger troughs above them. Separating the smaller from the larger troughs is a plate N⁷, so perforated that the several small troughs n³ are fed only with the contents of the single larger trough N³ and the troughs n⁴ n⁵ n⁶ with those of the single larger trough N⁴, N⁵, or N⁶, respectively.

Figure 16:
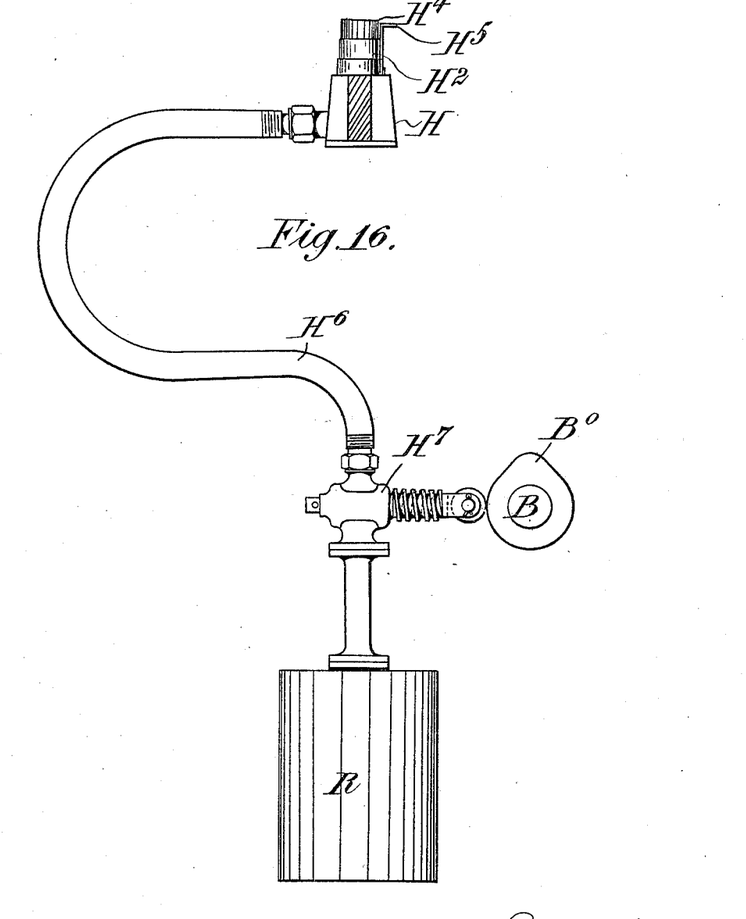
Fig. 16 is a diagram illustrating a vacuum vessel and its appurtenances alternative to the pump L, and Fig. 17 indicates diagrammatically arrangements whereby air-pressure or a piston can be applied to the contents of the hopper N to expedite their exit to the stencil.

It must be understood that the reciprocating hopper N need not be in all cases bottomless. For instance, there might be bristles or brushes N⁸ just within its lower end and extending to its outlet, as shown in Fig. 15, through which the icing or other fluid or semifluid material should pass or strain instead of being allowed to gravitate unobstructed to the mouth of the hopper-outlet. Further, instead of producing the desired sudden vacuum in the tubes H⁴ by a pump operating intermittently and giving a quick suction-stroke, as described, an arrangement such as illustrated in Fig. 16 may be adopted. In this view there is shown a vacuum vessel R, in which a vacuum approximately constant is maintained by any suitable means. This is coupled to the hollow bar H by a connection H⁶, in which there is a valve or cock H⁷, automatically operated by some moving part of the machine, such as a tappet B⁰ on the shaft B, at proper intervals to give the momentary suction effect required.

Figure 17:
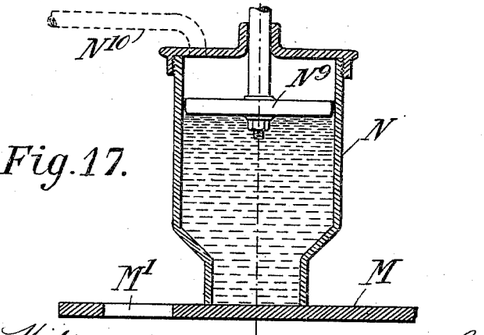

The upper portion of the reciprocating hopper N, hereinbefore assumed to be open, can be made parallel-sided and closed, as indicated in Fig. 17, so that pressure can be applied to the upper surface of the contents intermittently or continuously either by a piston N⁹, operated in any suitable manner from any convenient moving part of the machine, or, the piston being dispensed with, by air-pressure delivered into the upper closed end of the hopper—say by the pipe N¹⁰—(indicated in dotted lines.)

It will be understood that the shape of the perforations of the stencils, the disposition and grouping of the pneumatic tubes or other devices supporting the biscuits, and the shape of the feed-columns and of the portions of the feeder-plates which take the biscuits from the columns may be suited to the size and shape of the biscuits to be operated on. Further, more than one shape and size of biscuit can be treated in one machine according to this invention. For instance, one half or side of the machine may be devoted to one type of biscuit and the other side of the machine to another.

Figure 18:
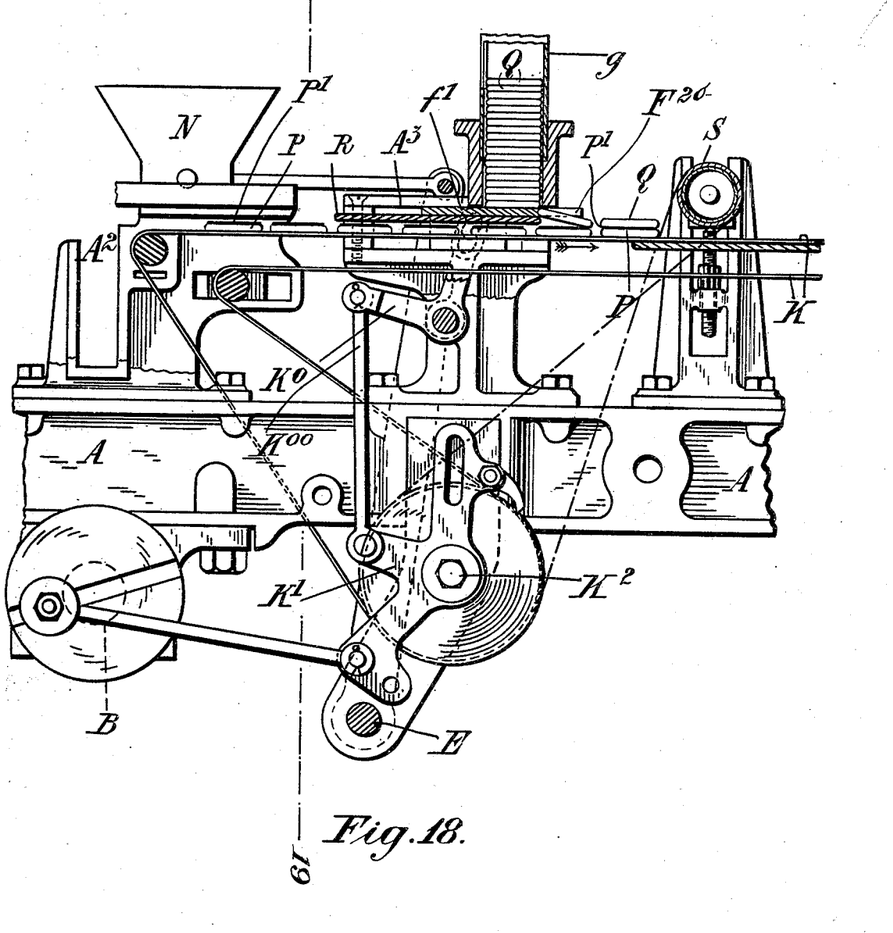
Fig. 18 illustrates in side elevation, partly in section, the device, hereinbefore referred to, for laying covering biscuits on the iced coatings of other biscuits.
Figure 19:
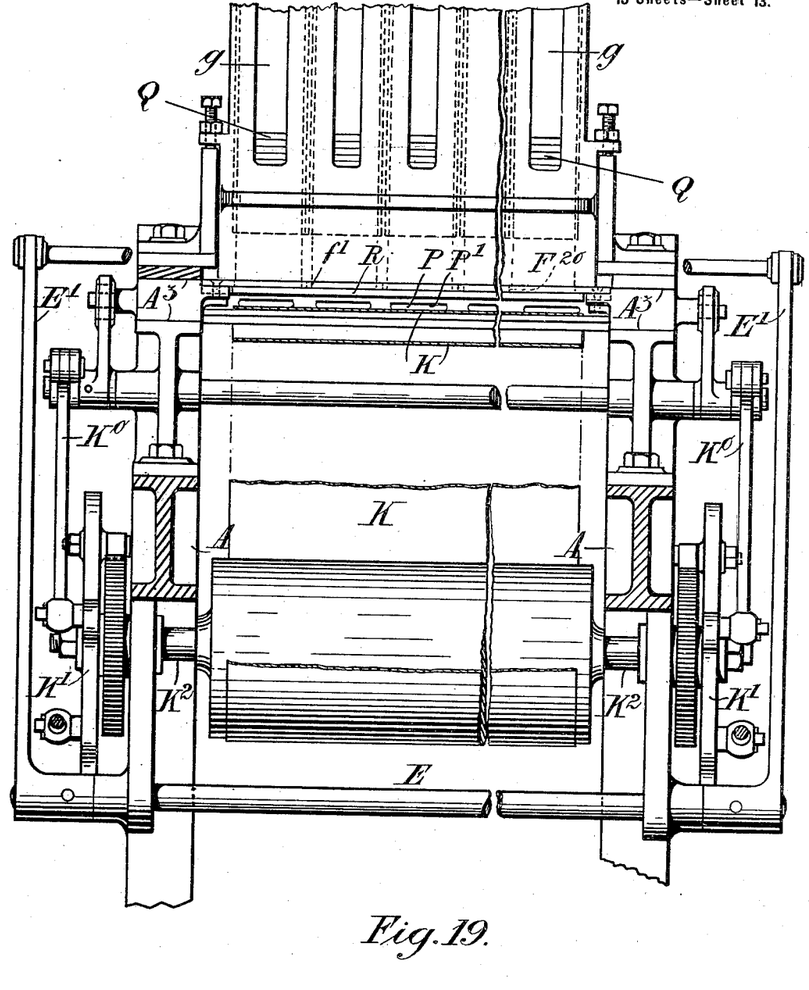
Fig. 19 is an end view in section on the line 19 19 of Fig. 18.

In Figs. 18 and 19 the belt conveyer K, with iced biscuits P upon it, is shown as having above it the device hereinbefore referred to for laying covering biscuits Q upon the coatings P' of the coated biscuits, so as to produce biscuit sandwiches P P' Q. In this device a feeder-plate $f'$ is reciprocated in guides $A^3$ in the frame A by any convenient operative connection, such as the lever and rod $K^0 K^{00}$ and an arm K', extending from the shaft $K^2$, by which the belt conveyer K is operated, so as to move forward intermittently. The feeder-plate $f'$ is similar to the feeder-plate F', hereinbefore referred to, except that it has gaps $F^{20}$ at its leading edge, which are semicircular and unprovided with the bars $F^3$, such as are seen in Fig. 4. Immediately below it is a table R, upon which the under side of the feeder-plate bears, and between the under side of the table and the conveyer K there is just sufficient space to permit the rows of coated biscuits to pass onward through it upon the conveyer. Immediately above the feeder-plate $f'$ is fixed a group of feeder-columns $g$, (like the feeder-columns G in Fig. 1,) containing the covering biscuits Q, hereinbefore referred to. The front end R' of the table R extends forward beneath the feeder-columns $g$, as shown. Reciprocation of the feeder-plate $f'$ causes the lowermost biscuit in each column $g$ to be pushed out of it along the table R and over the front end of the latter just at the time that a row of biscuits lying upon the conveyer K transversely of its direction of motion is moved by that conveyer in the direction of the arrow from under the front edge R' of the table R, so that the leading edge of the upper biscuit—i. e., the biscuit coming from the table—descends upon the leading edge of the lower biscuit—i. e., the biscuit on the conveyer—in the manner illustrated in the drawings, and the upper biscuit as the conveyer K moves onward drops flat upon the icing P' on the lower one, so forming a biscuit sandwich P P' Q. Near the table is a rubber or other yielding roller S, mounted in bearings in the frame A. This roller applies pressure to the biscuit sandwiches, so as to cause the two biscuits and the icing to adhere firmly together. A stationary pressure-plate might be put in place of the roller for the same purpose.

What we claim as our invention, and desire to secure by Letters Patent, is—

1. In a coating-machine, the combination with a stencil-plate and a feed-column to contain the articles intended for treatment, of a reciprocating plate which receives the articles from the feed-column, a lifter to raise the articles from the reciprocating plate to the stencil-plate and an operative connection between the lifter and the reciprocating plate whereby the latter places the articles over the lifter and after they have been treated ejects the same from the lifter, substantially as set forth.

2. In a coating-machine, the combination with a stencil-plate, of a hollow lifter serving also as a disengager placed below the stencil-plate openings, means to raise the lifter toward the stencil-plate, and means when thus raised to produce a partial vacuum within the lifter, substantially as and for the purpose set forth.

3. In a coating-machine, the combination with a stencil-plate, of a hollow lifter serving also as a disengager, tubular extensions each communicating with the interior of the lifter, an elastic tube within each extension, a shoulder in the lifter to support the bottom of each elastic tube, means to raise the lifter toward stencil-plate, and means to produce a vacuum within the lifter when thus raised, substantially as set forth.

4. In a coating-machine, the combination with a stencil-plate, of a hollow lifter serving also as a disengager, tubular extensions each communicating with the interior of the lifter by a relatively restricted passage, an elastic tube within each extension, a shoulder in the lifter to support the bottom of each elastic tube, means to raise the lifter toward the stencil-plate and means to produce a vacuum within the lifter when thus raised, substantially as set forth.

5. In a coating-machine, the combination with a stencil-plate and a hopper movable relatively thereto, of a lever operatively connected with the latter, a driving-shaft, a cam on that shaft to coöperate with that lever, a pedal, an elastic connection between that pedal and the aforesaid lever comprising a spring, a feed-column to contain the articles intended for treatment, a feeder-plate, a hollow lifter serving also as a disengager, tubular extensions each communicating with the interior of the lifter by a relatively restricted passage, an elastic tube within each extension, a shoulder in the lifter to support the bottom of each elastic tube, a vacuum vessel, a conduit connecting the interior of the vacuum vessel with that of the lifter, a vacuum-regulator in that conduit and an operative connection between the feeder-plate the lifter and the regulator, substantially as set forth.

6. In a coating-machine, the combination with a stencil-plate and a hopper movable relatively thereto, of a lever operatively connected with the latter, a driving-shaft, a cam on that shaft to coöperate with that lever, a pedal and an elastic connection between that pedal and the aforesaid lever comprising a spring, substantially as set forth.

7. In a coating-machine, the combination with a stencil-plate and a hopper movable relatively thereto, of an operative connection between them, a feed-column to contain the articles intended for treatment, a feeder-plate, a lifter to elevate the articles from the feeder-plate to the stencil-plate, an operative connection between the feeder-plate, and the lifter, a conveyer, a table upon the conveyer, a second feeder-plate and a second feed-column upon that table, and an operative connection between the conveyer, the second feeder-plate and the hopper and stencil-plate aforesaid, substantially as set forth.

In testimony whereof we have signed our names to this specification in the presence of two subscribing witnesses.

GEORGE SAMUEL BAKER.
WILLIAM THEODORE CARR.

Witnesses to the signature of George Samuel Baker:
WALTER J. SKERTEN,
W. J. NORWOOD.

Witnesses to the signature of William Theodore Carr:
ERNEST HUTCHINSON,
THOMAS SCOTT.